Nov. 6, 1962 F. W. DROSTEN ET AL 3,062,641
PROCESS FOR INTRODUCTION OF TITANIUM TETRACHLORIDE
Filed June 25, 1956
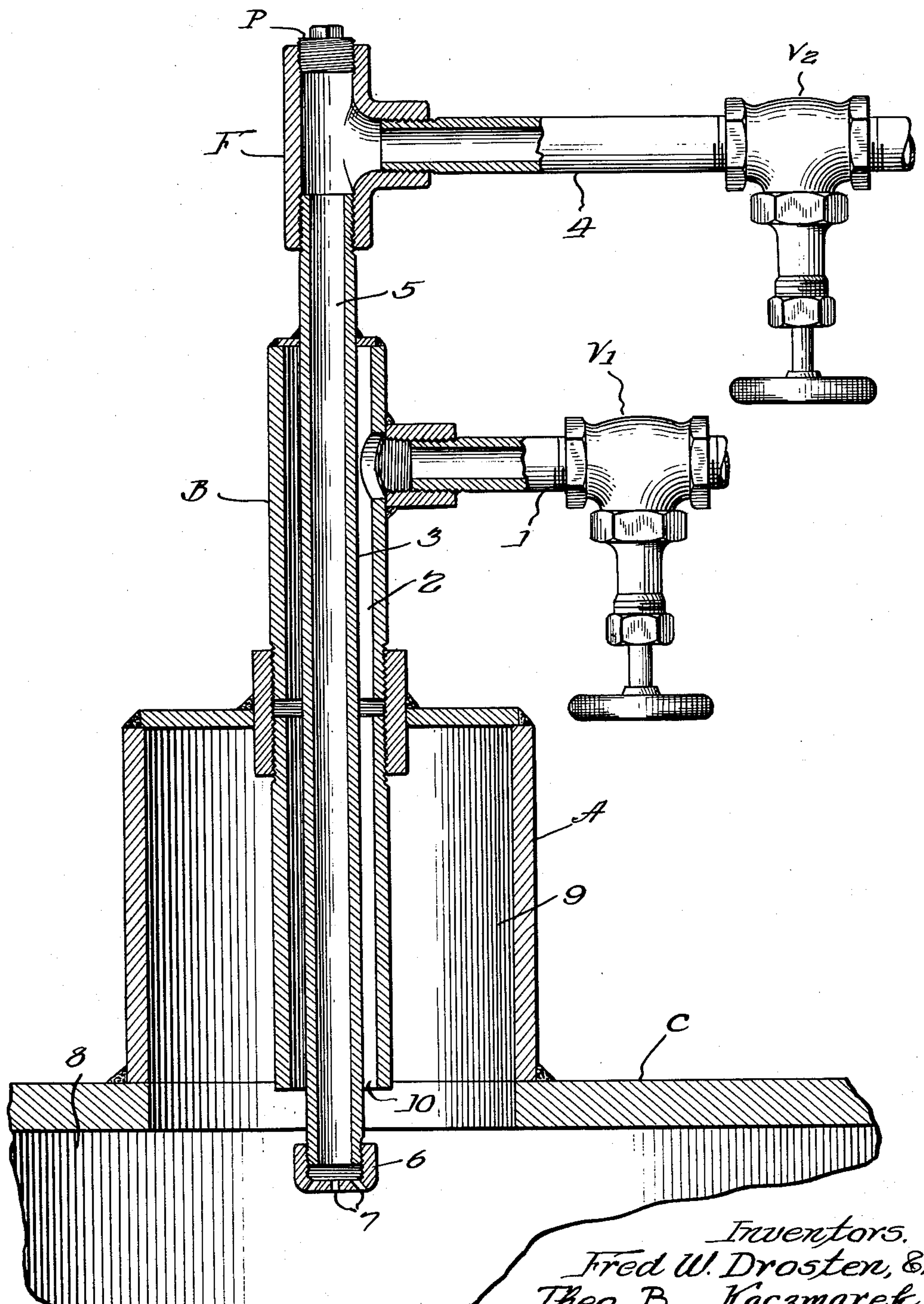

United States Patent Office 3,062,641 Patented Nov. 6, 1962

1

3,062,641
PROCESS FOR INTRODUCTION OF TITANIUM TETRACHLORIDE

Fred W. Drosten and Theo. B. Kaczmarek, Chattanooga, Tenn., assignors, by mesne assignments, to Republic Steel Corporation, Cleveland, Ohio, a corporation of New Jersey, and Crane Co., Chicago, Ill., a corporation of Illinois Filed June 25, 1956, Ser. No. 593,485
1 Claim. (Cl. 75—84.5)

This invention relates generally to titanium manufacture and more particularly to a process for permitting the uniform introduction of titanium tetrachloride into a reactor for the production of titanium sponge, by its reduction with magnesium.

At the outset in order to have a better appreciation of the merits of our invention, it should be understood that in the preparation of titanium sponge by the Kroll process, titanium tetrachloride is introduced into a reaction vessel containing molten magnesium. Usually, a piping connection centrally located on the cover of the reaction vessel serves as point of introduction of titanium tetrachloride. Titanium tetrachloride, as source material, is liquid and can be controlled, metered, and valved according to usual practices. As the titanium tetrachloride liquid, through an open pipe, enters the vessel containing magnesium, titanium sponge is formed with the simultaneous formation of magnesium chloride as a by-product. As the reaction progresses, there is a tendency for the sponge formation to assume the shape of a mound with its apex tending to converge with the point of entry of titanium tetrachloride. This condition is objectionable because it limits the maximum utility of the vessel, since the flow of titanium tetrachloride may be interfered with. Likewise, the formation of the sponge will proceed less regularly as this formation occupies more and more of the space in the vessel.

It will also be understood that the production of titanium sponge is what is known to those skilled in the art as a batch process and consequently maximum utility of raw materials and processing equipment can be achieved with the production of large batches of reproducible amount and within uniform dimensional limits.

One obvious method of minimizing the effect of mound formation below the source of the titanium tetrachloride feed is the distribution of the feed through multiple points of entry on the reactor cover. However, this solution results in greater assembly and control problems, since it is necessary that the feed material, that is titanium tetrachloride, be distributed to the various points within the reactor vessel at nearly the same rate throughout.

Accordingly to accomplish multiple feed from the single piping source, it was discovered that a spray cap could be put into service in which the piping connections are centrally located in the cover of the reactor vessel. However, repeated attempts to effectively feed titanium tetrachloride through a spray nozzle resulted in many interruptions in the processing accountable to many probable sources, as for example, due to graphite or other thread lubricant since pipe fittings for titanium tetrachloride must be sealed, connected and made pressure tight, and thus requires that threads and other fittings be provided with sealing lubricant. Then also rust formed from process piping vessels. It was also found that reaction products formed such as sponge titanium, lower chlorides of titanium and magnesium chloride. In addition, condensed magnesium, magnesium chloride, and lower chlorides of titanium caused additional difficulties and operation of the reaction under these conditions was not predictable and the reaction had to be terminated early in many instances due to failure of feed. Various methods of insuring

2 against each of the possibilities of blocking the feed were questionably successful and then only to a limited degree.

In the preliminaries leading to this invention, in no instance was the ambient temperature of the feed nozzle controlled for the reaction, but in all instances, following past precedents, the reaction was begun after the magnesium was molten, and therefore, the cover and its complementary areas were hot.

It was subsequently discovered that it was desirable to cool the entry nozzle simultaneous to starting the reaction, because the results obtained indicated that the temperature of the nozzle was the greatest single contributing factor to the prior objectionable blocking of the nozzle. In no instance did feed blocking occur, once cooling was provided. Other sources of blocking did not require any special precautions.

It is therefore an important object of the present invention to provide coolant to the nozzle for titanium tetrachloride preferably prior to its use as a source of titanium tetrachloride feed, by the use of titanium tetrachloride flowing around the reactor feed piping and nozzle.

It is a further object of this invention to bring about the introduction of titanium tetrachloride into a reactor feed nozzle sufficiently cold that limited vaporization takes place with a negligible amount of reaction with the vapors of magnesium therewithin.

It is a still further object of this invention to provide for the more efficient use of such reaction vessels for the production of titanium sponge.

It is another object of this invention to provide for the manufacture of titanium sponge in such manner that the reaction can be continued until maximum utilization of magnesium has been achieved.

It is another object of this invention to provide for the manufacture of titanium sponge in a manner that increased rates of production can be obtained.

Further objects and advantages of the invention will become evident as the description proceeds and from the examination of the accompanying drawing which illustrates one embodiment of the piping, fittings and valves setting forth the invention.

Referring to the drawing, a valved line 1 leads to the chamber 2 around the outer area of the feed pipe 3 as shown in the drawing. Chamber 2 communicates at 10 with the reactor chamber 8. Likewise, a valved line 4 leads separately to the inner section 5 of the feed line 3. The latter line is fitted at its inner terminus with a spray cap 6 which has perforations 7 for the distribution of titanium tetrachloride liquid within the reactor C in a manner similar to that experienced in a shower spray, as shown in the section illustrated. Preferably the spray cap 6 extends within the chamber 8 of reactor C in a plane just below the upper limits of the said chamber and below the chamber 9 of the reactor extension portion A. The usual fitting F, plugged at P may be used as indicated.

The procedure for the production of titanium sponge using the herein described arrangement is as follows: After the magnesium within the reactor chamber 8 is molten, titanium tetrachloride feed is started through the outer pipe 1 by opening the valve $V_1$, with the valve $V_2$ on the spray line 3 being in closed position. After a short period of reaction, as indicated by the absence of a pressure accumulation during the introduction of titanium tetrachloride through this line, the valve $V_2$ leading to the spray line 3 is then opened and the valve $V_1$ to the outer chamber 2 is then closed. From this moment on, it has been discovered that the reaction can be continued at a rate of at least 100 pounds per hour for whatever period is required to complete the batch operation for the production of titanium sponge. While the reference herein has been made to titanium, it will be clear that the apparatus and process may also be applied to other metals. It will therefore be appreciated that while only a single embodiment has been shown and described this invention is capable of being applied to a wide variety of devices. The invention should therefore be measured by the scope of the appended claim interpreted in light of the prior art.

We claim:

In the production of titanium sponge, the steps comprising melting magnesium in a vessel, feeding selectively through different telescoping means liquid titanium tetrachloride into the vessel, supplying to one of the telescoping means liquid titanium tetrachloride as a coolant, shutting off the supply of said coolant to its telescoping means and subsequently continuing the reaction by supplying liquid titanium chloride through the other one of said telescoping means.

References Cited in the file of this patent

UNITED STATES PATENTS

| | | |
|---|---|---|
| 2,708,158 | Smith | May 10, 1955 |
| 2,760,858 | Findlay et al. | Aug. 28, 1956 |
| 2,782,118 | Hood | Feb. 19, 1957 |
| 2,828,199 | Findlay | Mar. 25, 1958 |
| 2,870,007 | Boettcher et al. | Jan. 20, 1959 |

FOREIGN PATENTS

| | | |
|---|---|---|
| 1,074,024 | France | Mar. 31, 1954 |